Figure 1:
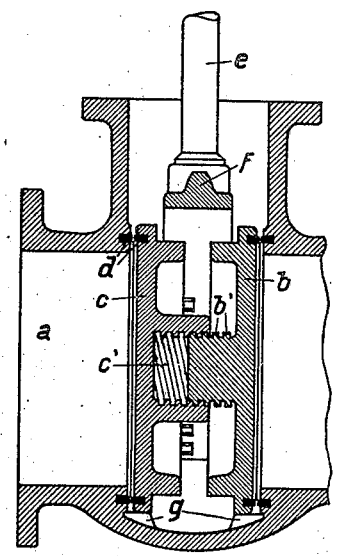

July 24, 1923.

E. EDLER

EXPANDING GATE VALVE

Filed Nov. 19, 1920

1,462,635

Patented July 24, 1923.

1,462,635

UNITED STATES PATENT OFFICE.

EDUARD EDLER, OF LEIPZIG-LINDENAU, GERMANY, ASSIGNOR, BY MESNE ASSIGNMENTS, TO ALBERT KARL ISELER AND ALBERT GEORG WILHELM ISELER, BOTH OF LEIPZIG-PLAGWITZ, GERMANY.

EXPANDING GATE VALVE.

Application filed November 19, 1920. Serial No. 425,220.

(GRANTED UNDER THE PROVISIONS OF THE ACT OF MARCH 3, 1921, 41 STAT. L., 1313.)

*To all whom it may concern:*

Be it known that I, EDUARD EDLER, a citizen of the German Republic, residing at Leipzig-Lindenau, Germany, have invented certain new and useful Improvements in an Expanding Gate Valve (for which I have filed applications in Germany March 22, 1919 Patent No. 332874, Belgium May 31, 1920; France June 18, 1920 Patent No. 517421, Holland June 18, 1920 Patent No. 6875 and England July 2, 1920 Patent No. 146362), of which the following is a specification.

Slide stop valves with parallel steam-tight surfaces have become known in which the slides are toothed and are turned in the act of closing thus being pressed the one away from the other tightly against their oppositely disposed seats.

The slides present however the inconvenience that the turning of the slide plates is continued either during the entire stroke of the screw spindle, or the slide plates are taken along by the up stroke of the spindle by means of a link embracing said slide plates, whereby the passage of the valve is uncovered. A consequence of this construction is however that the mass of the slides becomes uncommonly large in the direction of the spindle as well as in the direction of the passage of the steam jet. There is further no possibility to rotate the packing rings without endangering the tightness of the packing.

In order to obtain a reliable packing of the slides it is advisable to lift the packing rings of the slide plates off the packing rings in the housing only so far that a damaging of the same at the lifting and lowering of the slide plates is avoided with certainty. There ought further to exist the possibility that the packing rings in the casing and in the slide plates can be rotated repeatedly, the slide plates preserving their central position with regard to the slide passage even if the inner distance of the packing surfaces in the casing becomes greater, a secure packing being in this case effected through a greater depression of the link which effects the turning of the slide plates.

The improvements which will be described hereafter fulfil these requirements and do away also with the inconveniences connected with the slide stop valves of known construction.

According to this invention a yoke is used for operating the obturating discs wherefrom results the advantage that the teeth need not be arranged at a part of the casing which is not easily accessible. The yoke withdraws the obturating discs only so far from the packing surfaces as is absolutely necessary in order to avoid contact with the packing surfaces when the obturating discs are being raised. The obturating discs are rapidly raised from the packing surfaces at the beginning of the upward movement of the spindle. The obturating discs bear against the sides of the yoke and form in this position a solid whole with the yoke, remaining in this position during the entire upward movement of the spindle.

Figure 3:
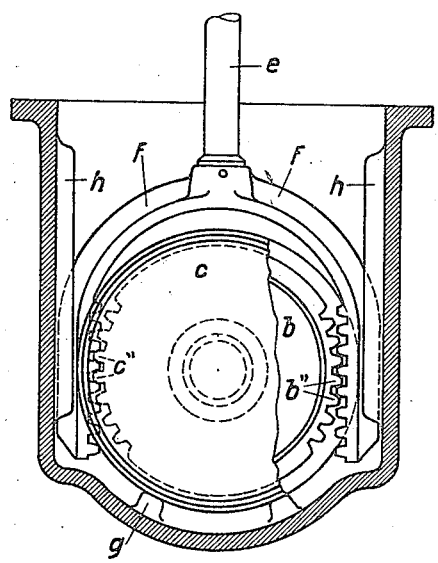
Figure 2:
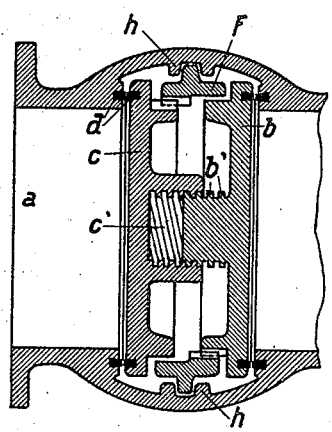

In the accompanying drawing the improved high pressure slide stop valve with parallel steam tight surface is shown by way of example in Fig. 1 in vertical section, in Fig. 2 in horizontal section and in Fig. 3 in side elevation.

It consists of the housing $a$, the two obturating discs $b$ and $c$, the packing rings $d$, the spindle $e$ and the yoke $f$ the movement of which is effected from the spindle $e$ through the intermediary of a hand wheel and threaded sleeves or other means.

The obturating disc $b$ has at its centre a threaded pin $b'$, the obturating disc $c$ having a female thread $c'$ into which the threaded pin $b'$ is screwed. The obturating discs have further each a toothed sector $b''$ or $c''$ respectively shown in Fig. 3. The yoke $f$ which is connected with the lower end of the spindle $e$ has teeth upon its inner surfaces designed to engage with the teeth of the sectors $b''$ and $c''$ of the obturating discs, so that when the yoke is being raised or lowered the obturating discs $b$ and $c$ are turned in opposite directions. The distance across the part of the yoke which embraces the toothed part of the obturating discs is smaller than the diameter of the obturating discs so that said discs are moved towards one another when they are being turned in consequence of the up stroke of the yoke and bear at either side against the arm of the yoke before the teeth of the yoke get out of engagement with the teeth of the obturating discs so that said discs can be taken along by the ascending yoke.

The central position of the obturating discs with regard to the packing rings $d$ in the housing is obtained by means of guide nipples $g$ arranged in the housing upon which the obturating discs rest when the slide valve is at its end position. The yoke $f$ is accurately guided through guide ridges $h$ in the housing.

The operation is as follows:—

When the slide stop valve is being closed through the down stroke of the spindle $e$ with yoke $f$ the obturating discs $b$ and $c$ settle upon the guide nipples $g$ and the packing rings $d$ are centered the one with regard to the other.

As the yoke $f$ continues its downward movement its teeth causes the rotation of the obturating discs $b$ and $c$ in opposite directions whereby these discs are moved away from each other, the packing ring $d$ being thus tightly pressed the one upon the other. As the teeth of the obturating discs $b$ and $c$ are arranged as closely as possible to the circumference the turning movement of the obturating discs becoming consequently very great at the moment when the obturation is effected, the packing rings $d$ are pressed upon one another with considerable force, an absolutely tight closure being thus effected.

When the obturating discs are being opened, that is to say at the up stroke of the yoke $f$, the obturating discs $b$ and $c$ are first turned and thus screwed together whereby the packing rings move away the one from the other in horizontal direction until the inner surfaces of the obturating discs bear against either side of the yoke $f$. As the yoke continues its upward movement the obturating discs are raised by means of the yoke, a further turning of the discs being prevented as they tightly bear against the sides of the yoke, the passage of the slide valve being thus uncovered.

It is not obligatory to arrange the teeth which transmit the movement to the obturating discs at the yoke $f$, they could be arranged at any other convenient part, e. g. in the inner wall of the housing. The teeth could further be arranged in separate wheel bodies adapted to turn with the obturating discs but fixed in axial direction.

I claim:—

1. A high pressure slide stop valve with parallel steam-tight surfaces comprising in combination a housing, one obturating disc, a threaded pin on the centre of said obturating disc, a second obturating disc having a female thread at the centre for the reception of said threaded pin, packing rings, a valve spindle, a yoke for operating said threaded connection, and means for transmitting the motion of said spindle to said yoke.

2. A high pressure slide stop valve with parallel steam-tight surfaces comprising in combination a housing, two obturating discs, said obturating discs having teeth along part of the circumference, packing rings, a valve spindle, a yoke, teeth upon the inner surface of said yoke designed to engage with the teeth of the obturating discs, and means for transmitting the motion of said spindle to said yoke.

3. A high pressure slide stop valve with parallel steam-tight surfaces comprising in combination a housing, two obturating discs, said obturating discs having teeth along part of the circumference, packing rings, a valve spindle, a yoke for operating the disk, the distance across said yoke at the part which embraces the obturating discs being smaller than the diameter of said obturating discs, and means for transmitting the motion of said spindle to said yoke.

4. A high pressure slide stop valve with parallel steam-tight surfaces comprising in combination a housing, two obturating disks having teeth along part of the circumference packing rings, a valve spindle, a yoke embracing and operating said obturating disks and being smaller than the diameter of said obturating disks at the part which embraces the same, and means for transmitting the motion of said spindle to said yoke so that the upward movement of the obturating disks begins only when the same have been turned so that they stand closer together.

In testimony whereof I affix my signature in presence of two witnesses.

EDUARD EDLER.

Witnesses:
 JUSTIZRAT DR. VICTOR BERGER,
 ALBERT STRICKERT.